April 22, 1924.

A. G. DE NORTHALL

SAW 1,491,134

Original Filed Feb. 9, 1920

INVENTOR.
Adrian G. de Northall
BY
ATTORNEY.

Patented Apr. 22, 1924.

1,491,134

UNITED STATES PATENT OFFICE.

ADRIAN G. DE NORTHALL, OF LOS ANGELES, CALIFORNIA.

SAW.

Application filed February 9, 1920, Serial No. 357,471. Renewed August 17, 1923.

*To all whom it may concern:*

Be it known that I, ADRIAN G. DE NORTHALL, a subject of Great Britain, residing in the city of Los Angeles, county of Los Angeles, and State of California, have invented certain new and useful Improvements in Saws, of which the following is a specification.

My invention relates to saws, and more particularly to saws adapted for sawing logs and heavy timber, such as cross-cut saws, and it has as its principal object to provide a saw in which there are two saw blades operating flatwise against each other and reciprocating in opposite directions, with means whereby pull applied to the end of one of said saw blades operates to exert pull in the opposite direction at the opposite end of the other saw blade, thus avoiding any buckling action for the reason that both saw blades are pulled endwise through the log or timber, alternately in opposite directions. Another object of my invention is to provide in such a saw a construction in which power is applied to the same ends of the contiguous saw blades, or at one end of the saw structure, with operating connecting means at the opposite ends of said saw blades for accomplishing the above-mentioned object.

I have illustrated one practical embodiment of my invention in the accompanying sheet of drawings, in which,—

Figure 4:
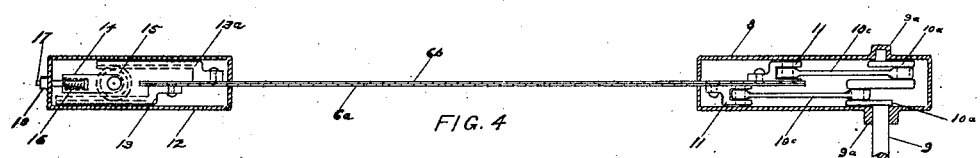
Figure 4 is a top plan view thereof in part section.
Figure 3:
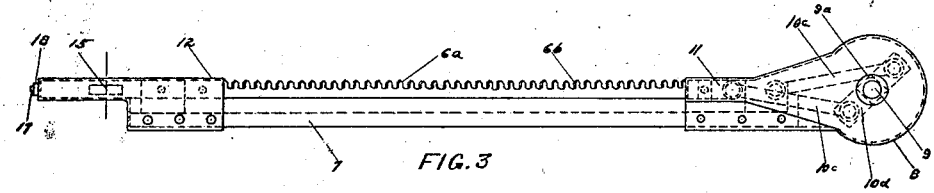
Figure 3 is a side elevation of a complete device.
Figures 1, 2:
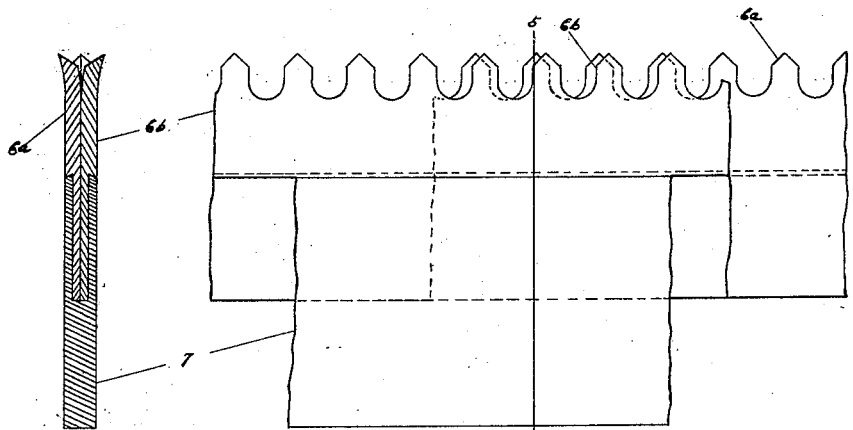
Figure 1 is a fragmentary side elevation of two saw blades in contiguous relationship and mounted to move in a suitable guide.
Figure 2 is a cross sectional view thereof, taken on line 5—5 of Fig. 1.

Referring now in detail to the drawings illustrating one embodiment of my invention, the two saw blades are designated $6^a$ and $6^b$, and the guide in which they are movably mounted is designated 7. This guide member is of a thickness corresponding to the combined thickness of the saw blades and is adapted to enter the saw kerf and follow the saws through the log or timber being cut. The manner in which the saw blades fit into the guide blade is clearly shown in Figs. 1 and 2. Secured to the right hand end of the guide blade 7, as seen in Fig. 3, is a bearing casing 8, in which is a crank shaft 9, provided with two cranks, $10^a$ and $10^a$, the inner end of the shaft 9 having a bearing in the side of the casing 8, as at $9^a$. Said cranks are connected by means of pitmen $10^c$ and $10^c$ with the ends of the saw blades, as at 11, 11, as clearly illustrated in Fig. 4, whereby when said crank shaft is driven, said saw blades will be driven in opposite directions by said cranks and said pitmen.

Figure 5:
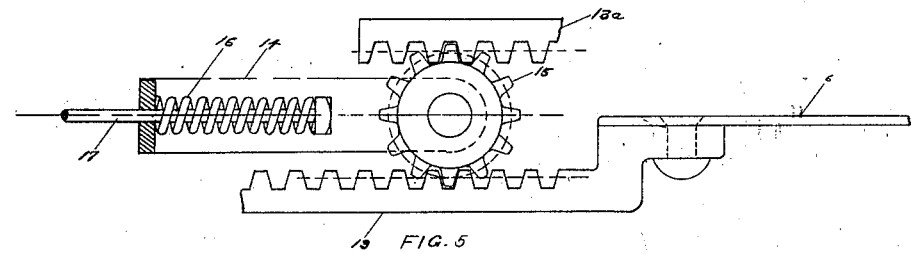
Figure 5 is an enlarged fragmentary view of the operating connections at the ends of the saws.

At the opposite end, said guide blade or member 7 is provided with another casing, secured thereto, and into which the ends of the saw blades extend as shown. Said saw blades have attached thereto two rack members 13, $13^a$, as seen in Fig. 5, with their teeth arranged in their adjacent or inner sides, said racks being offset to provide a space therebetween to receive a gear, 15, which meshes with both racks, as shown. Said gear is carried between the arms of a yoke 14, which has an anchor bolt 17 therein, provided with a spring 16, as shown, the outer end of the bolt 17 being provided with a nut 18, for adjusting the bolt 17, within the casing 12, and thus adjusting the yoke 14, which carries the gear 15. The spring 16 provides a yielding connection between the saw blade racks 13 and $13^a$ and the gear 15, carried by the yoke 14, thus exerting any desired tension on both saw blades at this end.

It will be understood from the foregoing construction and arrangement, that when one saw blade is moved in one direction by the crank shaft 9, the blade thus pulled, through its rack and the gear at the opposite end, exerts a pull at the other end of the other saw. Thus pull on one end of one saw operates through the racks and gear to apply pull in the opposite direction on the other end of the other saw, instead of using the thrust or push action on either saw solely. This avoids any tendency of the saws to buckle for the reason that both saw blades are operated principally by the pull action, and this is accomplished through the rack and gear connections at the free ends of the saws, or the ends of the saw blades removed from the source of power, which is the crank shaft in the present showing.

I am aware that changes in the details of construction and arrangement here used for purposes of illustration can be made without departing from the spirit of my invention, and I do not, therefore limit my invention to these details, except as I may be limited by the hereto appended claims.

I claim:

1. A sawing device of the character referred to comprising a guide member of substantially the thickness of two saw blades and open in one edge for a substantial portion of its width, two saw blades having a substantial portion of their blade bodies inserted into said guide member, to move therein in opposite directions, housings attached to the opposite ends of said guide member, and driving means within one of said housings, connected with said saw blades, and adapted to move them simultaneously in opposite directions, substantially as described.

2. A sawing device of the character referred to comprising a blade-like guide member adapted to receive in one of its edges two saw blades, housings attached to the opposite ends of said guide member, two saw blades inserted edgewise into the edge of said guide member for a substantial portion of their widths, power transmitting means in said housings and connected with the opposite ends of said saw blades for moving them simultaneously in opposite directions, and means for operating the same, substantially as described.

Signed at Los Angeles, Los Angeles county, California, this 2nd day of February, 1920.

ADRIAN G. DE NORTHALL.

In presence of—
D. O. FAWCETT,
WM. R. LITZENBERG.